(12) United States Patent
Huang (10) Patent No.: US 11,351,457 B2
(45) Date of Patent: Jun. 7, 2022

(54) SELECTING AN ANCHORED OFFSET TARGETING POSITION

(71) Applicant: Riot Games, Inc., Los Angeles, CA (US)

(72) Inventor: Alexander Nixon Huang, Los Angeles, CA (US)

(73) Assignee: RIOT GAMES, INC., Los Angeles, CA (US)

( * ) Notice: Subject to any disclaimer, the term of this patent is extended or adjusted under 35 U.S.C. 154(b) by 33 days.

(21) Appl. No.: 17/018,801

(22) Filed: Sep. 11, 2020

(65) Prior Publication Data

US 2022/0080316 A1 Mar. 17, 2022

(51) Int. Cl.
*A63F 13/5372* (2014.01)
*A63F 13/2145* (2014.01)
*A63F 13/5378* (2014.01)

(52) U.S. Cl.
CPC ...... *A63F 13/5372* (2014.09); *A63F 13/2145* (2014.09); *A63F 13/5378* (2014.09); *A63F 2300/1075* (2013.01); *A63F 2300/306* (2013.01); *A63F 2300/307* (2013.01)

(58) Field of Classification Search
CPC .............. A63F 13/5372; A63F 13/2145; A63F 13/5378; A63F 2300/1075; A63F 2300/306; A63F 2300/307
See application file for complete search history.

(56) References Cited

U.S. PATENT DOCUMENTS

| 4,209,832 | A | * | 6/1980 | Gilham | F41G 3/2644 345/629 |
| 4,475,132 | A | * | 10/1984 | Rodesch | A63F 13/00 386/235 |
| 6,761,632 | B2 | * | 7/2004 | Bansemer | A63F 9/0291 463/16 |
| 6,780,103 | B2 | * | 8/2004 | Bansemer | A63F 9/0291 463/25 |
| 7,056,210 | B2 | * | 6/2006 | Bansemer | A63F 9/0291 463/16 |

(Continued)

OTHER PUBLICATIONS

International Search Report and Written Opinion received for PCT Patent Application No. PCT/US2021/050082, dated Jan. 19, 2022, 11 pages.

*Primary Examiner* — David L Lewis
*Assistant Examiner* — Matthew D Hoel
(74) *Attorney, Agent, or Firm* — Shook, Hardy & Bacon LLP (57) ABSTRACT

Systems and methods for precise position selection of an offset anchor from items within a map of a multiplayer game with touchscreen gestures. Specifically, the systems and methods utilize inputs from a touchscreen, to selectively define an offset targeting position in relation to a selected target, e.g., for the selective teleportation of a player's character. In essence, the methods and systems facilitate a user's or "player's" ability to precisely position an character, offset from a target object (generally referenced herein as a "target"), utilizing an intuitive offset-positioning focus point reticle. The offset-positioning focus point reticle, as described herein, allows the player to precisely and efficiently select a radial and offset position for a character to be teleported to relative to a selected target.

20 Claims, 6 Drawing Sheets

(56) References Cited

U.S. PATENT DOCUMENTS

| | | | |
|---|---|---|---|
| 7,175,524 B2* | 2/2007 | Bansemer | A63F 9/0291 463/16 |
| 7,470,195 B1* | 12/2008 | Baldwin, III | A63F 13/10 463/33 |
| 7,510,477 B2* | 3/2009 | Argentar | A63F 13/10 463/36 |
| 7,559,834 B1* | 7/2009 | York | A63F 13/10 463/2 |
| 7,594,847 B1* | 9/2009 | York | A63F 13/00 463/5 |
| 7,736,230 B2* | 6/2010 | Argentar | A63F 13/06 463/36 |
| 7,789,749 B2* | 9/2010 | Bansemer | G07F 17/3262 463/20 |
| 7,846,015 B2* | 12/2010 | Bansemer | A63F 9/0291 463/16 |
| 8,012,016 B2* | 9/2011 | York | A63F 13/48 463/31 |
| 8,012,017 B2* | 9/2011 | York | A63F 13/42 463/31 |
| 8,277,316 B2* | 10/2012 | Haigh-Hutchinson | A63F 13/04 463/31 |
| 8,419,541 B2* | 4/2013 | Mao | A63F 13/214 463/37 |
| 8,523,677 B2* | 9/2013 | Baldwin, III | A63F 13/837 463/42 |
| 8,827,784 B2* | 9/2014 | Kotsugai | A63F 13/812 463/3 |
| 8,834,245 B2* | 9/2014 | Haigh-Hutchinson | A63F 13/837 463/2 |
| 9,004,997 B1* | 4/2015 | Prosin | A63F 13/5372 463/5 |
| 9,089,776 B2* | 7/2015 | Yamaoka | A63F 13/45 |
| 9,180,365 B2* | 11/2015 | Torre | A63F 13/245 |
| 9,370,713 B2* | 6/2016 | Okura | A63F 13/57 |
| 9,694,277 B2* | 7/2017 | Justice | A63F 13/60 |
| 9,764,226 B2* | 9/2017 | Prosin | A63F 13/00 |
| 9,773,324 B1* | 9/2017 | Ackley | G06T 7/90 |
| 9,802,117 B2* | 10/2017 | Kotsugai | A63F 13/92 |
| 9,919,205 B2* | 3/2018 | Kim | A63F 13/5378 |
| 10,159,901 B2* | 12/2018 | Justice | A63F 13/60 |
| 10,373,431 B2* | 8/2019 | Levi | A63F 13/216 |
| 10,518,172 B2* | 12/2019 | Chen | G06F 3/012 |
| 10,671,160 B2* | 6/2020 | Uscinski | G06K 9/00 |
| 10,702,776 B2* | 7/2020 | Ying | A63F 13/2145 |
| 10,716,995 B2* | 7/2020 | He | A63F 13/847 |
| 10,716,997 B2* | 7/2020 | He | H04M 1/00 |
| 10,788,290 B2* | 9/2020 | Gallery | F41A 33/00 |
| 10,990,257 B2* | 4/2021 | Wang | A63F 13/5378 |
| 11,033,813 B2* | 6/2021 | Brown | A63F 13/358 |
| 11,068,055 B2* | 7/2021 | Uscinski | A63F 13/211 |
| 11,077,375 B2* | 8/2021 | Yang | A63F 13/57 |
| 11,097,189 B2* | 8/2021 | Alderman | A63F 13/23 |
| 11,154,785 B2* | 10/2021 | Nakano | A63F 13/798 |
| 11,221,726 B2* | 1/2022 | Qiu | A63F 13/426 |
| 2002/0049082 A1* | 4/2002 | Bansemer | G07F 17/3286 463/20 |
| 2002/0077165 A1* | 6/2002 | Bansemer | A63F 9/0291 463/7 |
| 2004/0198490 A1* | 10/2004 | Bansemer | G07F 17/32 463/20 |
| 2005/0026664 A1* | 2/2005 | Bansemer | A63F 9/0291 463/7 |
| 2005/0130739 A1* | 6/2005 | Argentar | A63F 13/5255 463/36 |
| 2005/0197178 A1* | 9/2005 | Villegas | F41A 33/00 463/5 |
| 2006/0205474 A1* | 9/2006 | Bansemer | G07F 17/32 463/16 |
| 2007/0129133 A1* | 6/2007 | Bansemer | G07F 17/38 463/16 |
| 2007/0167232 A1* | 7/2007 | Argentar | A63F 13/04 463/36 |
| 2009/0176570 A1* | 7/2009 | Baldwin, III | A63F 13/837 463/33 |
| 2009/0181736 A1* | 7/2009 | Haigh-Hutchinson | A63F 13/837 463/2 |
| 2010/0331087 A1* | 12/2010 | Argenter | A63F 13/211 463/36 |
| 2011/0092290 A1* | 4/2011 | Huebner | A63F 13/837 463/39 |
| 2012/0122576 A1* | 5/2012 | Mao | A63F 13/837 463/32 |
| 2012/0184375 A1* | 7/2012 | Okura | A63F 13/5372 463/43 |
| 2012/0309478 A1* | 12/2012 | Kotsugai | A63F 13/92 463/3 |
| 2013/0225292 A1* | 8/2013 | Yamaoka | A63F 13/45 463/31 |
| 2014/0274379 A1* | 9/2014 | Justice | A63F 13/12 463/31 |
| 2014/0342788 A1* | 11/2014 | Kim | A63F 13/10 463/2 |
| 2014/0342789 A1* | 11/2014 | Kotsugai | A63F 13/44 463/3 |
| 2015/0157940 A1* | 6/2015 | Hall | A63F 13/533 463/31 |
| 2015/0258439 A1* | 9/2015 | Prosin | A63F 13/00 463/31 |
| 2017/0157501 A1* | 6/2017 | Codi | A63F 3/00075 |
| 2017/0193749 A1* | 7/2017 | Levi | G06Q 50/01 |
| 2017/0200391 A1* | 7/2017 | Misra | A63F 13/213 |
| 2017/0274284 A1* | 9/2017 | Justice | A63F 13/12 |
| 2017/0278273 A1* | 9/2017 | Ackley | G06K 9/2063 |
| 2017/0296909 A1* | 10/2017 | Codi | A63F 3/02 |
| 2018/0043263 A1* | 2/2018 | Cao | H04W 4/026 |
| 2018/0292952 A1 | 10/2018 | Norman et al. | |
| 2018/0348861 A1* | 12/2018 | Uscinski | G06F 3/012 |
| 2019/0057531 A1 | 2/2019 | Sareen et al. | |
| 2019/0060745 A1* | 2/2019 | He | A63F 13/52 |
| 2019/0070494 A1* | 3/2019 | He | A63F 13/5378 |
| 2019/0118089 A1* | 4/2019 | Ying | A63F 13/53 |
| 2019/0212900 A1* | 7/2019 | Wang | A63F 13/235 |
| 2019/0226808 A1* | 7/2019 | Gallery | F41G 3/2611 |
| 2019/0355016 A1* | 11/2019 | Levi | G06Q 30/0209 |
| 2020/0111385 A1* | 4/2020 | Issa | G09B 5/02 |
| 2020/0206639 A1* | 7/2020 | Nakano | A63F 13/58 |
| 2020/0249755 A1* | 8/2020 | Uscinski | A63F 13/213 |
| 2020/0293154 A1* | 9/2020 | Qiu | A63F 13/2145 |
| 2020/0384359 A1* | 12/2020 | Brown | A63F 13/30 |
| 2020/0408490 A1* | 12/2020 | Gallery | F41G 3/2694 |
| 2021/0031106 A1* | 2/2021 | Aiderman | A63F 13/5378 |
| 2021/0146248 A1* | 5/2021 | Chen | A63F 13/53 |
| 2021/0370184 A1* | 12/2021 | Summa | A63F 13/837 |
| 2022/0011859 A1* | 1/2022 | Uscinski | G06F 3/016 |

* cited by examiner

SELECTING AN ANCHORED OFFSET TARGETING POSITION

BACKGROUND

Video games provide entertainment, competition, and intellectual stimulation for players. In a vast majority of video games, the control mechanics are critical to player (e.g., user) enjoyment. As such, the development, implementation and functionality of the input or combination of inputs used to control a player's character are a major focus of game programing. Traditional video games (e.g., those played on a desktop or laptop) can take advantage of dedicated input devices (e.g., keyboard and mouse) to facilitate a large number of easily accessible control mechanics. For example, a common control mechanic in traditional video games may include a series of input commands such as skill activation input (e.g., a keyboard button press), target positioning (e.g., mouse movements), and skill execution (e.g., a mouse button press). However, the shared display/input surface and relatively small display area of mobile devices (e.g., smartphones, tablets, and the like) present challenges for the complex control mechanics of some games. Similarly the limited number of input channels and comparatively lower precision of those channels of mobile devices and "consoles" present challenges for precision execution of the complex control mechanics.

SUMMARY

Aspects of the present disclosure relate to techniques for the precise targeting of player character actions using a displayed off-set graphical element. Display of the offset graphical element can be triggered by a predetermined input command on a touch based interface that establishes a displayed object as an anchor object. Once the anchor object is selected, a targeting position is determined using touch-screen gestures.

As a non-limiting and illustrative example, precise offset targeting location selection on a touchscreen during a multiplayer game can be accomplished utilizing a user-interactable focus point reticle within a targeting area. The focus point reticle and circular targeting area are displayed after the player provides an input, such as selecting an action command icon, such as a teleportation command icon. Once the player selects the teleportation command icon, the player can selectively define a position of the focus point reticle within the targeting area. Movement of a touch input, which moves a skill aiming tool, can actively adjust the position of the focus point reticle. If an object is located within a targeting area, a selection perimeter can be presented around the object to indicate that the object is selected as the target. In some aspects, when multiple targets are within the targeting area, the closest target to the focus point reticle can be selected as the target. Alternatively, in some aspects, when multiple targets are within the targeting area, the closest target to the player's avatar (i.e., the character the player is controlling) can be selected as the target. A straight line is drawn from the focus point reticle to the selected target. The line drawn intersects the selection perimeter at a point closest to the focus point reticle. At that point, a target indicator is displayed, which defines the position the avatar will teleport to. The player can then provide another input, such as de-selecting the skill (e.g., the teleportation command icon) and the player's avatar will then be teleported to the location of the targeting indicator.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present disclosure are described in detail below with reference to the attached drawing Figures, wherein.

DETAILED DESCRIPTION

As online multiplayer gameplay moves to mobile devices and hand-held touchscreen devices, size constraints of such mobile device touchscreens present various challenges. For example, multiplayer online battle arena (MOBA) games or other multiplayer strategy video games oftentimes require rapid selection of a position to move a player's avatar. This is particularly common in MOBA games. Typically, MOBA games are fast paced and commonly present gameplay situations where the rapid input of commands provide strategic advantages for a player (e.g., a user). However, gameplay on touchscreen devices, such as mobile phones, presents a variety of disadvantages in gameplay control when compared to traditional PC style gameplay. For instance, maps on touchscreen devices can be presented with a decreased size that can make it difficult for a user to see. More so, fingers or thumbs are commonly utilized for providing control inputs. They are comparatively imprecise (e.g., selecting between two locations that are relatively close in a game space is challenging) and can obscure portions of the map. This can cause decreased user accuracy and slower gameplay, particularly when performing operations that require precision and speed. One particular operation, oftentimes seen in MOBA games, is an avatar's ability to teleport from its current position on a map to a teleport destination near a selected target object on the map, such that an attack operation can be performed by the avatar onto the target object from the teleport destination.

When conventional MOBA games are played on personal computers or "PCs" (e.g., non-mobile or non-touchscreen devices), the teleport operation is generally easy to perform because the mouse, as an input device, facilitates the user's rapid selection of a target object, and the rapid defining of a teleport destination relative to the selected target object.

That is, a player can easily use his or her mouse to select an intended target object, define a teleport destination somewhere near but offset the intended target object, and select that teleport destination as the location for the player's avatar to teleport to. However, as MOBA games started migrating from PCs into touchscreen devices, touch-based input controls were found to be, in many respects, less functional than their mouse and keyboard counterparts. Because teleport operations are still a characteristic of certain avatars in MOBA gaming, touchscreen-based MOBA games have made the teleport operations available, but have sacrificed the player's ability to precisely and selectively define a teleport destination relative to and offset a selected target object. Instead, touchscreen-based MOBA games simply allow the player to select the target object, initiate a teleport operation, and teleport the player's avatar to a fixed offset targeting location (e.g., always at a three o'clock position) relative to the target object. While this solution preserves the player's ability to teleport, skilled MOBA gamers know that complete and precise control of their avatar's position on the map is an essential component of success.

As such, various aspects of the present disclosure are directed to systems and methods for utilizing inputs received via a touchscreen or console controller to select, or in other words precisely and efficiently define, an offset targeting location for an avatar of a game, such as a MOBA game. In some example aspects, precise offset targeting location selection is accomplished by selectively defining a position of a focus point reticle within a targeting area of an avatar, and presenting a selection perimeter around a target object determined within the targeting area. The presentation of the selection perimeter allows for the calculation of a vector from the location of the focus point reticle to a point closest to the focus point reticle along the selection perimeter.

An example method in accordance with the present disclosure can include the steps of providing for display an avatar and an object within a map on a touchscreen, and receiving a touch gesture on a tool selection icon or virtual joystick to initiate a teleport operation. The initial detection of the touch gesture can initiate the targeting area relative to the player's avatar. In some aspects, the targeting area can take the shape of a semi-circle around the avatar, such that its center corresponds to the location of the avatar. Once the targeting area is established, a target can be selected if it is determined to be located within the targeting area. The touch gesture can be moved in a continuous manner, such that a location of a focus point reticle can be selectively defined by the user's touch gesture.

A target can then be selected based in part on the location of the target within the targeting area. A selection perimeter can be presented around the selected target to indicate selection of the target. In some aspects, the object can be selected based further on its distance to the focus point reticle, particularly when compared to relative distances between one or more other objects within the targeting area and the focus point reticle. Alternatively, in some aspects, the object can be selected based further on its distance to the avatar, particularly when compared to relative distances between one or more other objects within the targeting area and the avatar. A vector can then be calculated from a location of the focus point reticle to the object. The vector passes through a point along a selection perimeter of the selected object, the point being the closest point along the selection perimeter to the location of the focus point reticle. In some aspects, the location of the focus point reticle corresponds to a center point of the focus point reticle. An offset target indicator can be provided for display at the point along the selection perimeter, indicating the avatar's future location (e.g., the avatar's teleport destination). In some aspects, an input (e.g., touch input and release of touch gesture, or press of a controller button and release of the controller button) can cause the avatar to teleport from its current position to the position of the offset target indicator. That is, in response to another input by the player, the avatar can be removed from display and provided for redisplay at the position of the offset target indicator.

As used herein, the term "object" refers to a player-controlled character, a computer-controlled character, or any other element of the gaming environment capable of interaction with a player. Computer-controlled characters are commonly referred to as a "bot", "non-player character" (NPC), "minion", or "mob" depending on the genre of the game. Illustrative examples of other elements of the gaming environment include structures and items.

The term "shared gaming environment" refers to the objects and game space of a game. The game space of a game is commonly referred to as an "instance", "map", "world", "level", or "board" depending on the genre of the game. For example, it is contemplated that the game space can be a persistent world (such as those of massive multi-player online role playing games (MMORPG)), a session-based instance in a persistent world (such as a raid, player-versus-player arena, or player-versus-environment arena in an MMORPG), or a session-specific instance of a world (such as a battle royale map, real-time strategy map, MOBA map, or similar maps).

The term "screen view" refers to a portion of the shared gaming environment that a player is viewing. Said another way, a screen view is the sub-section of the shared gaming environment that is displayed to a particular player at a particular moment.

Figure 1:
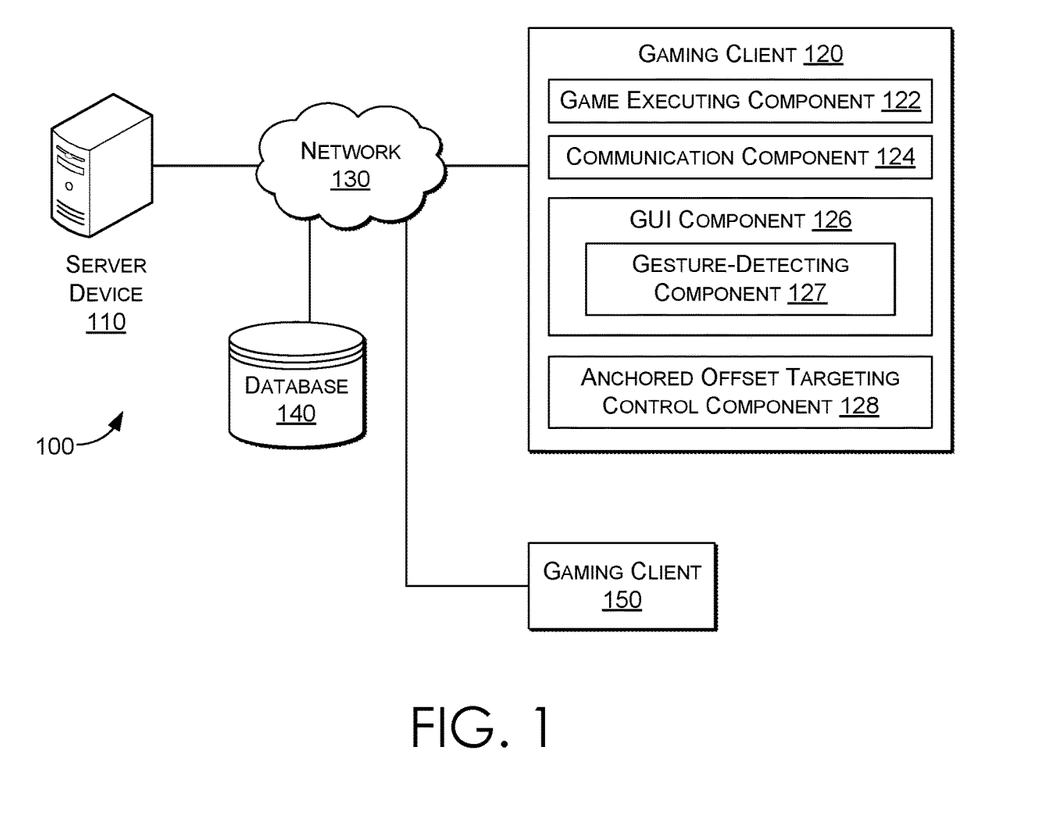
FIG. 1 depicts an example system for precision offset positioning with touch gestures, in accordance with aspects hereof.

Turning now to FIG. 1, a schematic depiction is provided illustrating one example operating environment 100 of which an aspect of the present disclosure can be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The operating environment 100 of FIG. 1 includes a server device 110 that provides a service to one or more client devices, such as gaming clients 120,150, for instructing game play and/or defining settings in a virtual gaming environment over a network 130, such as the Internet. The gaming clients 120,150 may be implemented on one or more processors as later described herein. In some aspects, the gaming clients 120,150 are mobile electronic devices, such as smart phones, tablets, or laptop computers, having touchscreens thereon. The server device 110 and the gaming clients 120,150 may communicate in a wired or wireless manner over the network 130.

Gaming clients 120,150 generally facilitate a player's (i.e., user of a device) interaction with a shared gaming environment. For example, the gaming client can display the screen view of the shared gaming environment and the game's user interface. Additionally, the gaming client can convert player input into commands that control the screen view or the player's character. A device (e.g., a mobile device or console) can facilitate this interaction by executing the gaming client to allow a player to join the shared gaming environment. The gaming client may include operational modules that can utilize a combination of hardware, firmware, and computer executable instructions that facilitate a player interaction with a shared gaming environment. The gaming client may include any number of other gaming elements that facilitate joining the shared gaming environment, such as account login, matchmaking, character selection, chat, marketplace, and so forth. An illustrative example of such a gaming client includes, but is not limited to, Riot's League of Legends: Wild Rift®.

Aspects of a gaming client (e.g., gaming client 120 or gaming client 150) can include a game executing component 122, a communication component 124, and a graphical user interface (GUI) component 126. The game executing component 122 can be configured for executing a game associated therewith, such as MOBA games described herein. In some aspects, executing the game may include displaying a user interface. The communication component 124 can be configured for network communications between the gaming client 120, the gaming client 150, the server device 110, or any combination thereof via network 130.

The GUI component 126 can be programmatically configured to facilitate displaying the shared gaming environment and various interactable features of the game, such as menus, virtual joysticks, icons, fixed or movable objects, and so forth. In some aspects, the GUI component 126 can further comprise a gesture-detecting component 127 configured for detecting a touch gesture on a touchscreen of the gaming client 120, as later described herein. The touch gestures may be converted to input commands and communicated to the game executing component 122 and anchored off-set targeting control component 128.

GUI component 126 also includes an anchored off-set targeting control (AOTC) component 128. Generally, the AOTC component 128 facilitates a selectively activated targeting assistance protocol. The targeting assistance protocol can use input commands and dynamic graphical elements to communicate and execute complex game mechanics in mobile-based or console-based games. When a qualifying skill or action is selected by the player the targeting assistance engine can be selectively activated automatically. The AOTC component 128 may monitor subsequent inputs and communicate the effects of those inputs with the targeting assistance protocol. The AOTC component 128 can further detect a targeting termination input and communicate a set of commands to the game executing component 122 for execution in the shared gaming environment.

In more detail, AOTC component 128 may identify the skills associated with the character controlled by the user of gaming client 120. Each skill, a skill, or a particular set of skills can have a set of targeting rules. The targeting rules can vary depending on the game. For example, the targeting rules for a teleportation, blink, dash, hook, jump, or any other type of movement or movement attack skill may have rules related to skill range, placement range, valid object class, or any other rule. During a login or session initiation the AOTC component 128 may detect the particular character selected by the user associated with gaming client 120. AOTC component 128 can search locally maintained game data or database 140 for the skills and skill rules associated with the selected character. Additionally, or alternatively, AOTC component 128 can monitor information communicated to the gaming client 120 via network 130.

Continuing, the AOTC component 128 can monitor the input commands detected by GUI component 126. The input commands detected by the AOTC component 128 can activate, aim, execute, or abandon (e.g., cancel casting) the skill. For example, the AOTC component 128 may activate a targeting assistance protocol of the AOTC component 128 in response to activation of a skill. The AOTC component 128 can interpret particular input commands to adjust the aim of the skill. For example, the AOTC component 128 can convert moving a skill aiming tool using a touch-based interface into movement of a focus point reticle. For another example, the AOTC component 128 can convert input from an analog joystick or touch pad into a direction and magnitude. The AOTC component 128 can map the direction to the radial orientation of a focus vector and the magnitude to the position of the focus point reticle along the focus vector. Additionally, the AOTC component 128 may convert a particular command to execution of the skill at the location the skill is aimed. For example, removing a held button or icon press can indicate an execution input command. Similarly, the AOTC component 128 may convert a lack of input for a predetermined period of time or a predetermined cancel input command into instructions to deactivate the targeting assistance protocol and the associated skill.

Upon activation, the targeting assistance protocol may detect objects in a targeting area based on the particular targeting rules associated with the activated skill. For example, a targeting area can be determined based on the skill's range. The rules may further identify the valid object classes (e.g., player character, non-player character, building, allied object, rival object, and so forth) associated with the skill. The targeting assistance protocol can scan the shared gaming environment to identify each valid object within the targeting area. The targeting assistance protocol can use locally stored data related to the shared gaming environment or monitor data communicated to the gaming client 120 via the network 130 to determine the locations of objects within the targeting area. For example, gaming client 150 can communicate data representative of movement of a character associated with gaming client 150 in the shared gaming environment.

Additionally, the AOTC component 128 generates a dynamic graphic representation of the targeting area, a targeting point, a focus point reticle, a selection perimeter, a skill aiming tool, or any combination thereof. The particular graphic representations may vary depending on the game. However, the dynamic graphic representations provide visual indications to the user of gaming client 120 that communicate the activation of an anchored off-set targeting control mechanic. For example, activation of the targeting assistance protocol. The AOTC component 128 can dynamically update the graphic representations based on additional input commands. For example, inputs from a controller or touchscreen may correspond to movement of the skill aiming tool in a first direction. In response, the AOTC component 128 can modify the dynamic graphic representation of the focus point reticle with a proportional movement in the first direction.

Further, the AOTC component 128 can dynamically anchor the targeting assistance protocol to a valid object within the targeting area. For example, where multiple valid objects are within the targeting area the AOTC component 128 may anchor the targeting assistance protocol on a particular valid object based on a set of rules. The rules may be at least partially customizable by the user of gaming client 120 or may be predetermined. In an aspect, the AOTC component 128 anchors on the closest valid object to the focus point reticle. As the objects move or the focus point reticle moves the anchor may dynamically change to another valid object. In another aspect, the AOTC component 128 may anchor the targeting assistance protocol on a particular valid object based on a priority hierarchy. The priority hierarchy may vary by game. For example, the hierarchy may prioritize valid objects by type, such as rival player characters before rival buildings. Additionally, or alternatively, the hierarchy may prioritize objects based on properties associated with the object, such as total remaining hit points, overall hit points, current bounty (e.g., in game reward for defeating the object), or any other relevant object property.

In some aspects, the server device 110 can be coupled, directly or indirectly, to a database 140 for facilitating the storage and querying of records corresponding to a plurality of game play instructions, actions, objects, game spaces, settings, any other game data, or any combination thereof. The database 140 can include, among other things, a relational database or similar storage structure accessible by the server device 110. In accordance with aspects described herein, the database 140 can store a plurality of records that each corresponds to game play instructions, actions, objects, game spaces, settings, any other game data, or any combination thereof.

The server device 110 can include a gaming server accessible by any of the gaming clients 120,150 or a data server for supporting an application of any of the gaming clients 120,150, over the network 130. The gaming server can support any type of application, including those that facilitate live game play. The server device 110 can further determine relationships (e.g., teams) between the gaming clients 120,150. In various aspects, the server device 110 communicates actions commanded via one or more of the gaming clients 120,150, to another one or more of the gaming clients 120,150 for presentation thereon via user interfaces or the like.

Network 130 may be wired, wireless, or both. Network 130 may include multiple networks, or a network of networks, but is shown in simple form so as not to obscure aspects of the present disclosure. By way of example, network 130 can include one or more wide area networks (WANs), one or more local area networks (LANs), one or more public networks, such as the Internet, one or more private networks, or one or more telecommunications networks. Where network 130 includes a wireless telecommunications network, components such as a base station, a communications tower, or even access points (as well as other components) may provide wireless connectivity. Networking environments are commonplace in enterprise-wide computer networks, intranets, and the Internet. Accordingly, network 130 is not described in significant detail.

In accordance with aspects of the present disclosure, the server device 110 or the gaming clients 120, 150 can each be a computing device or be executed by a computing device that is capable of accessing the Internet, such as the World Wide Web, or a telecommunications network. Either one of the server device 110 or the gaming clients 120, 150 might take on a variety of forms, such as a personal computer (PC), a laptop computer, a mobile phone, a tablet computer, a wearable computer, a personal digital assistant (PDA), a handheld communications device, a smartphone, a smart watch, a workstation, any combination of these delineated devices, or any other suitable device. Makers of such devices include, for example, Google, Research in Motion, Samsung, Apple, Nokia, Motorola, Microsoft and the like.

It should be understood that any number of the aforementioned devices may be employed in operating environment 100 within the scope of the present disclosure. Each may comprise a single device or multiple devices cooperating in a distributed environment. Additionally, other components not shown may also be included within the distributed environment. It should further be understood that operating environment 100 shown in FIG. 1 is an example of one suitable computing system architecture. Each of the servers, gaming clients, networks, and databases shown in FIG. 1 may be implemented via a computing device, such as computing device 700, later described with reference to FIG. 7, for example.

Figure 2:
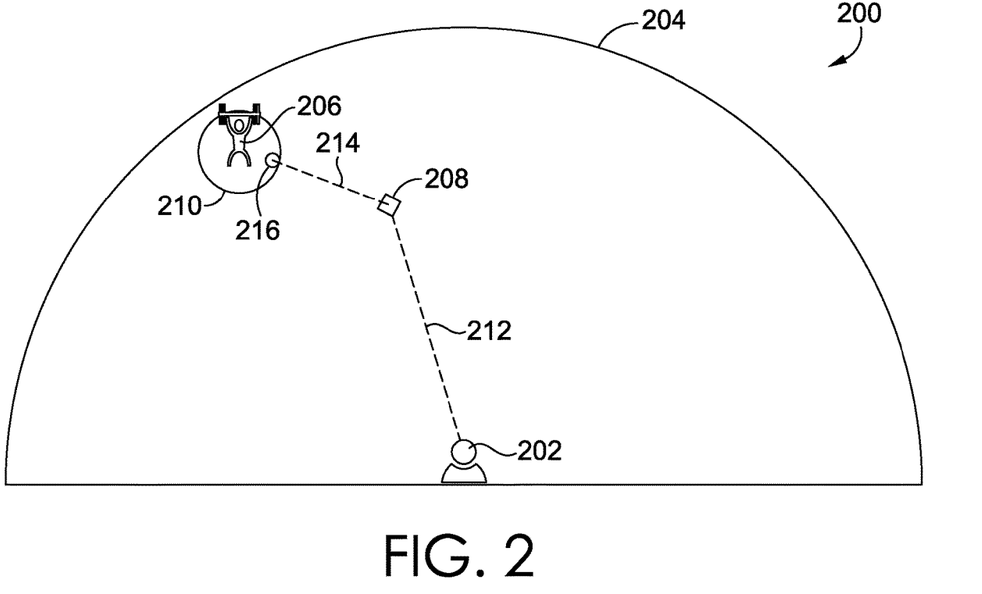
FIG. 2 depicts an example targeting protocol user interface for precisely defining an offset targeting position, in accordance with aspects hereof.
Figure 3:
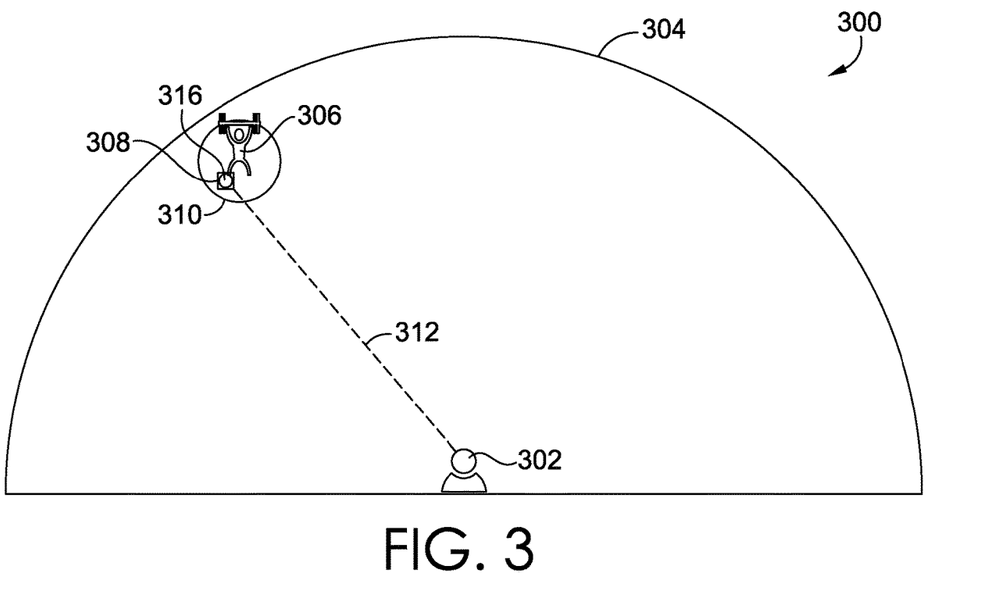
FIG. 3 depicts another example targeting protocol user interface for precisely defining a targeting position in accordance with some embodiments of the present disclosure.

FIGS. 2 and 3 depict illustrative examples of a selectively activated targeting assistance protocol user interface in accordance with aspects described herein. The selectively activated targeting assistance protocols described in relation to FIGS. 2 and 3 can be implemented by an AOTC component (e.g., AOTC component 128 of FIG. 1) in some aspects. The particular moments depicted in FIGS. 2 and 3 represent a moment after activation of the selectively activated targeting assistance protocol and prior to termination (e.g., execution or abandonment) of the associated skill mechanic. In other words, a user has already initiated a skill by selecting an icon representative of the skill or by pressing a controller button associated with the skill. However, the user has not provided the execution input command (e.g., removing a finger from the touch screen or releasing the controller button).

With specific reference to FIG. 2, an illustrative example 200 of a selectively activated targeting assistance protocol including a targeting reticle off-set from a focus point reticle is depicted in accordance with aspects described herein. The illustrative example 200 includes a character 202, a targeting area 204, and a valid target object 206. The character 202 represents the current location of the player character associated with the local game client (e.g., gaming client 120 of FIG. 1) in the shared gaming environment's game space.

The targeting area 204 is positioned such that its center is positioned at a center point of the character 202. The size and shape of the targeting area 204 may vary based on the particular skill's targeting rules in some aspects. For example, the targeting rules may define the targeting area 204 as a semi-circular space that has a particular radius from the character 202, such that the center of the flat side of the semi-circle corresponds to the position of the character 202. For another example, the targeting rules may define the targeting area as a full circle surrounding the character 202, such that the center of the circle corresponds to the position of the character 202. In an alternative aspect, the targeting area may be a predefined shape and size.

Valid target object 206 represents the location of an object in the shared gaming environment that satisfies any applicable object class rules associated with the particular skill. For example, a particular skill may define valid targets as any object within the target area. Another particular skill may define valid targets as any rival player character (e.g., a character controlled by the user of gaming client 150 of FIG. 1). As depicted, the valid target object 206 is within the targeting area 204. The valid target object 206 is surrounded by a selected object perimeter 210. The selected object perimeter 210 is centered on valid target object 206. The size and shape of selected object perimeter 210 may vary by skill or properties associated with character 202 (e.g., melee-based characters may have a first size and ranged-based characters may have a second size) or may be predefined. The selected object perimeter 210 is a representation of the range of potential locations of character 202 after execution of the particular skill. Additionally, in some aspects the selected object perimeter 210 can provide a visual indication that the targeting protocol is currently anchored on valid target object 206.

Additionally, illustrative example 200 includes a focus point reticle 208 along a focus vector 212. In some aspects, the focus vector 212 extends from the character 202 to the edge of the targeting area 204. The focus point reticle 208 is a particular point along the focus vector 212. The direction of the focus vector 212 and the location of the focus point reticle 208 are dynamically movable via user input moving a skill aiming tool (not depicted). In other words, as a player moves a skill aiming tool (e.g., drags a virtual joystick or manipulates an analog stick of a controller) the focus vector 212 may move in a corresponding direction through the targeting area 204. Similarly, the focus point reticle 208 may move along the focus vector 212. The focus point reticle 208 can have any shape, size, or design.

The illustrative example 200 also includes a target indicator 216 and a target vector 214. The target vector 214 is shortest straight line connecting the focus point reticle 208 to the selected object perimeter 210. Target indicator 216 is located at the point where the target vector 214 intersects the selected object perimeter 210. Accordingly, the target vector 214 and the target indicator 216 dynamically move in response to the dynamic movement of the focus point reticle 208. In other words, as a user interacts with a skill aiming tool the inputs are converted into movement of the focus point reticle 208. As focus point reticle 208 moves within the targeting area 204 the shortest straight line connecting the focus point to the selected object perimeter 210 may move. The target indicator 216 is thus dynamically moved around the edge of the selected object perimeter 210.

Continuing with specific reference to FIG. 3, an illustrative example 300 of a selectively activated targeting assistance protocol when a focus point reticle is positioned within a selected target perimeter is depicted in accordance with aspects described herein. In other words, and as mentioned above, a focus point reticle is dynamically movable via user manipulation of a skill aiming tool. FIG. 3 is a depiction of the selectively activated targeting assistance protocol at a moment when the focus point reticle is positioned within a selected target perimeter.

Similar to FIG. 2, illustrative example 300 includes character 302, targeting area 304, valid target object 306, focus point reticle 308, selected object perimeter 310, focus vector 312, and target indicator 316. However, in FIG. 3 the focus point reticle 308 is located within the selected object perimeter 310. As such, the focus point reticle 308 and the target indicator 316 are co-located at the same point within the selected object perimeter 310. Said another way, the selectively activated targeting assistance protocol of an AOTC component (e.g., AOTC component 128 of FIG. 1) can facilitate skill aiming within an object perimeter in response to detecting input commands that correspond to movement of the focus point reticle 308 to a location within the selected object perimeter 310. For example, when the focus point reticle 308 exists within the selected object perimeter 310, the AOTC component may detect that a vector that begins outside of the selected object perimeter 310 does not exist. As such, the AOTC component can automatically define the location of the focus point reticle 308 as the target indicator 316.

Figure 4:
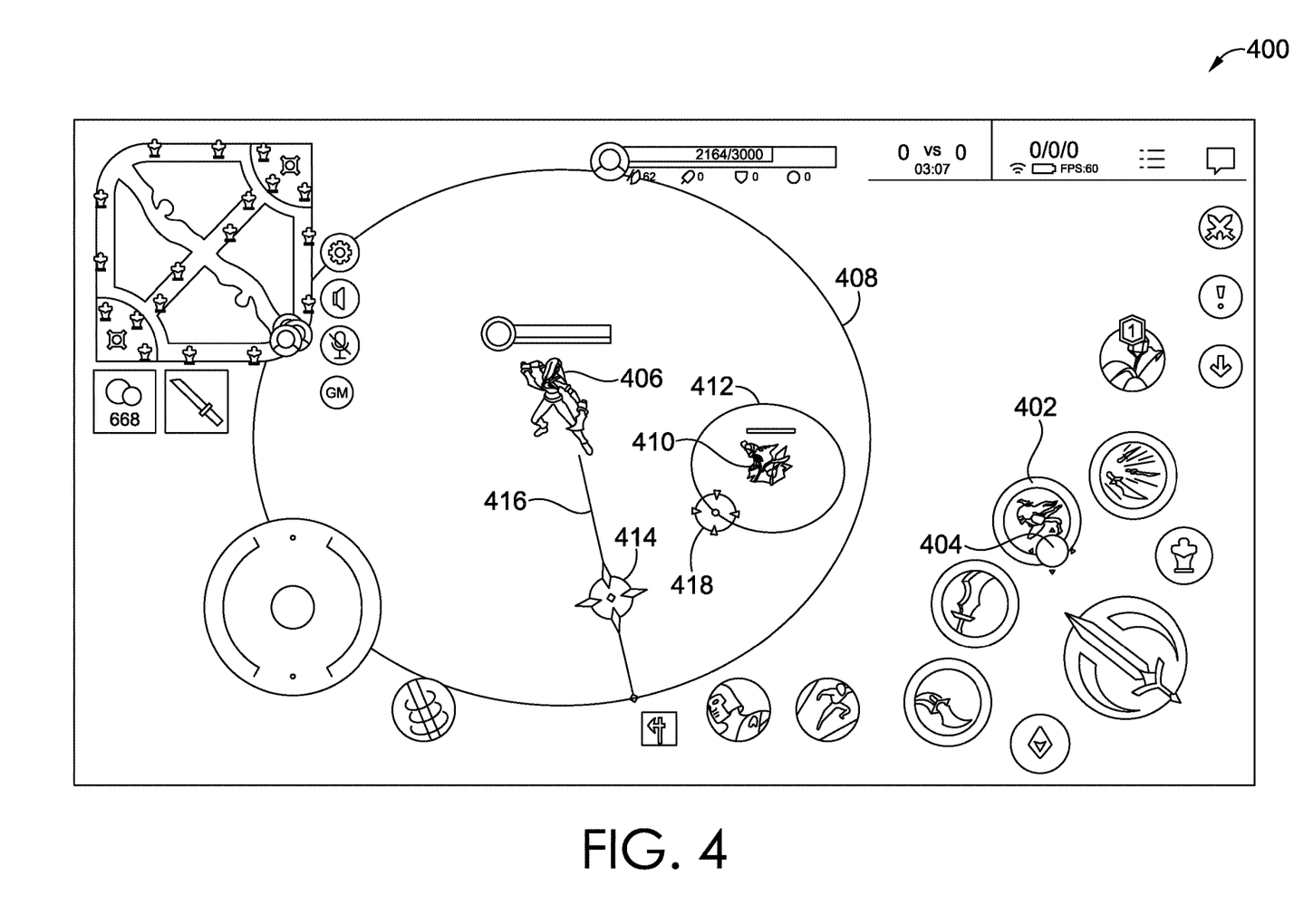
FIG. 4 depicts an example screen view of a shared gaming environment including an off-set targeting system, in accordance with aspects hereof.
Figure 5:
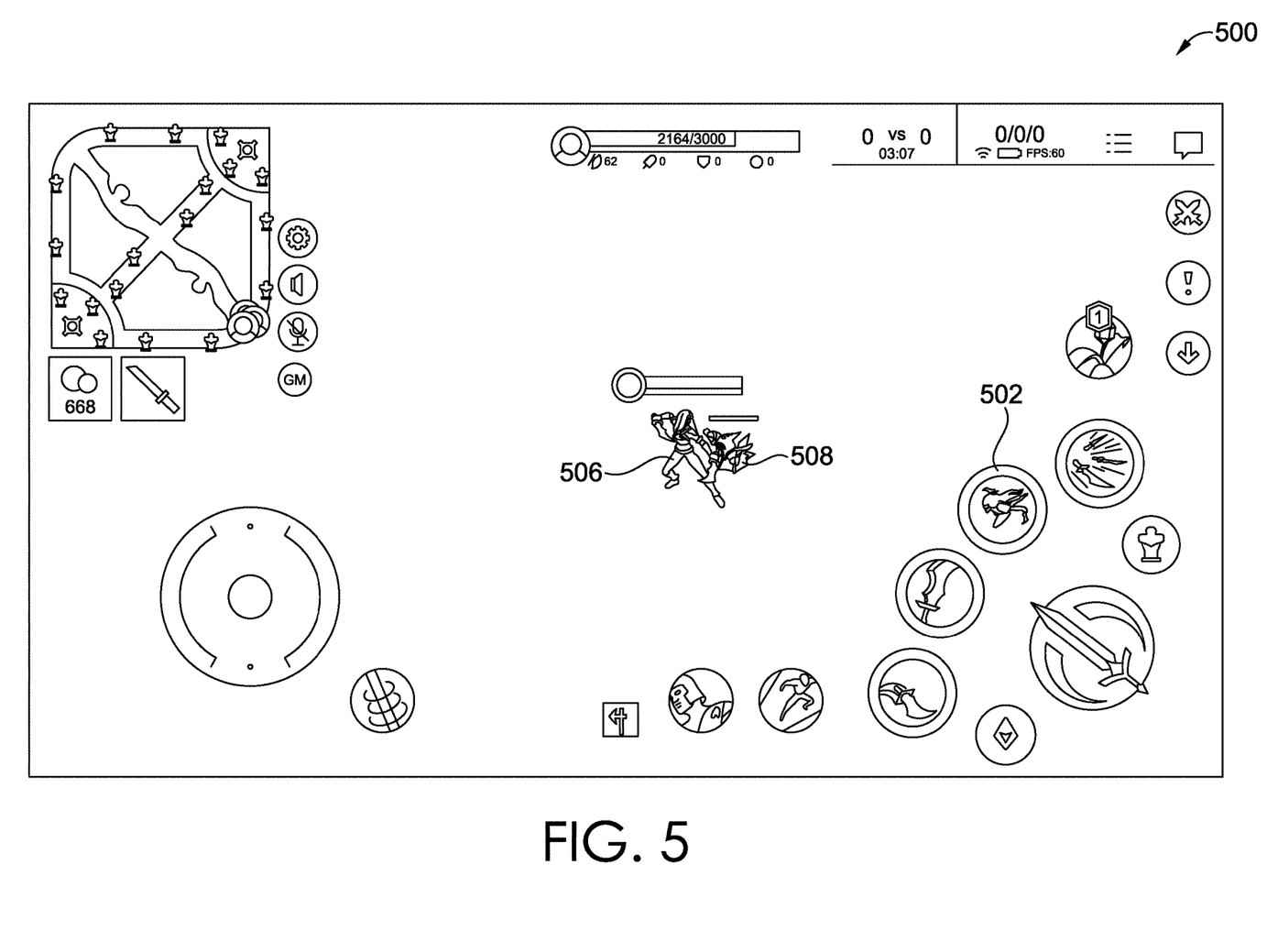
FIG. 5 depicts another example screen view of a shared gaming environment, in accordance with aspects hereof.

With general reference to FIGS. 4 and 5, example screen views are depicted at various moments of gameplay within a shared gaming environment. The moment depicted in FIG. 4 is representative of a moment during skill aiming using a targeting assistance protocol. The moment depicted in FIG. 5 is a moment immediately after successful execution of the skill aimed in FIG. 4. The screen views can include a particular portion of the game space, objects therein, and user interface (UI) elements (e.g., icons, text, or buttons). The UI elements can be overlaid on the portion of the shared gaming environment displayed in the screen view. Those skilled in the art will understand that a player UI can vary widely by game or platform (e.g., mobile device vs. console) and thus some player UIs include more, fewer, or different icons, text, or buttons. Further, those skilled in the art will understand that the design (e.g., shape, size, visual representation, color, visual effects) of the icons, text, or buttons in a UI can vary widely by game.

With specific reference to FIG. 4, an example screen view 400 with a selectively activated targeting assistance protocol including a targeting indicator off-set from a focus point reticle is depicted, in accordance with aspects described herein. The screen view 400 comprises player UI elements, such as a skill selection icon 402, a skill aiming tool 404, a targeting area 408, a focus point reticle 414 along a focus vector 416, and targeting indicator 418. The screen view also includes a character 406 and a valid target object 410.

The skill selection icon 402 is a graphic representation of an icon which can be used for initiating an operation such as a teleport operation. The operation may be used for selecting an anchored offset position and re-locating the player's character to that location. The skill selection icon 402 can be selectable via a touch gesture in some aspects. A touch gesture can include, for instance, tapping the touchscreen with one or more fingers, one or more thumbs, a stylus, or other such selection tool. Additionally or alternatively, a touch gesture can include pressing and dragging a finger, thumb, stylus, or other such selection tool across the touchscreen in a continuous fashion. A touch gesture can also include releasing the finger, thumb, stylus, or other such selection tool from the touchscreen at a release location, indicating an end of the touch gesture.

The skill aiming tool 404 is a graphic representation which can be generated by the AOTC component 128 in response to selection of the skill selection icon 402. The position of the skill aiming tool 404 can be dynamically modified based on the modification of the user's input (e.g. dragging the user's finger around the screen). In some aspects, movement of the skill aiming tool may be bound (i.e., limited) to a predetermined area around the particular skill selection icon. The location of the focus point reticle 414 is dynamically movable via user input moving a skill aiming tool 404. In other words, as a player moves a skill aiming tool (e.g., drags a virtual joystick or manipulates an analog stick of a controller) the focus point reticle 414 may move in a corresponding direction through the targeting area 408.

The character 406 represents the current location of the player character associated with the local game client (e.g., gaming client 120 of FIG. 1) in the shared gaming environment's game space. The targeting area 408 is positioned such that it is centered on character 406. The size and shape of the targeting area 408 may vary based on the particular skill's targeting rules in some aspects. Valid target object 410 represents the location of an object in the shared gaming environment that satisfies any applicable object class rules associated with the particular skill. As depicted, the valid target object 410 is within the targeting area 408. The valid target object 410 is surrounded by a selected object perimeter 412. The selected object perimeter 412 is centered on valid target object 410.

Target indicator 418 is located at the point where the target vector (not depicted) intersects the selected object perimeter 412. The target vector (not depicted) is the shortest straight line connecting the focus point reticle 414 and the selected object perimeter 412. Accordingly, the target vector and the target indicator 418 dynamically move in response to movement of the skill aiming tool 404 which determines the position of the focus point reticle 414.

Turning to FIG. 5, an example screen view 500 at a moment after execution of the skill activated in FIG. 4 is depicted in accordance with aspects described herein. Screen view 500 includes a skill selection icon 502, a character 506, and a valid target object 508.

The character 506 represents the current location of the player character associated with the local game client (e.g., gaming client 120 of FIG. 1) in the shared gaming environment's game space. The location of the character 506 represents a re-location from the character location depicted in FIG. 4. This re-location can be the result of a user's termination of a touch gesture (e.g. removal of finger manipulating the skill aiming tool from the screen). For example, terminating the touch gesture may be used to select the current location of the target indicator as the desired skill execution position. In response, the character 506 may then re-locate from its initial position to the position selected. In other words, a user removes a finger from the skill aiming tool and the character 406 is relocated from the character's position depicted in FIG. 4 to the location of the character 506. The location of the character 506 corresponds to the location of the target indicator 418, as described in FIG. 4.

Figure 6:
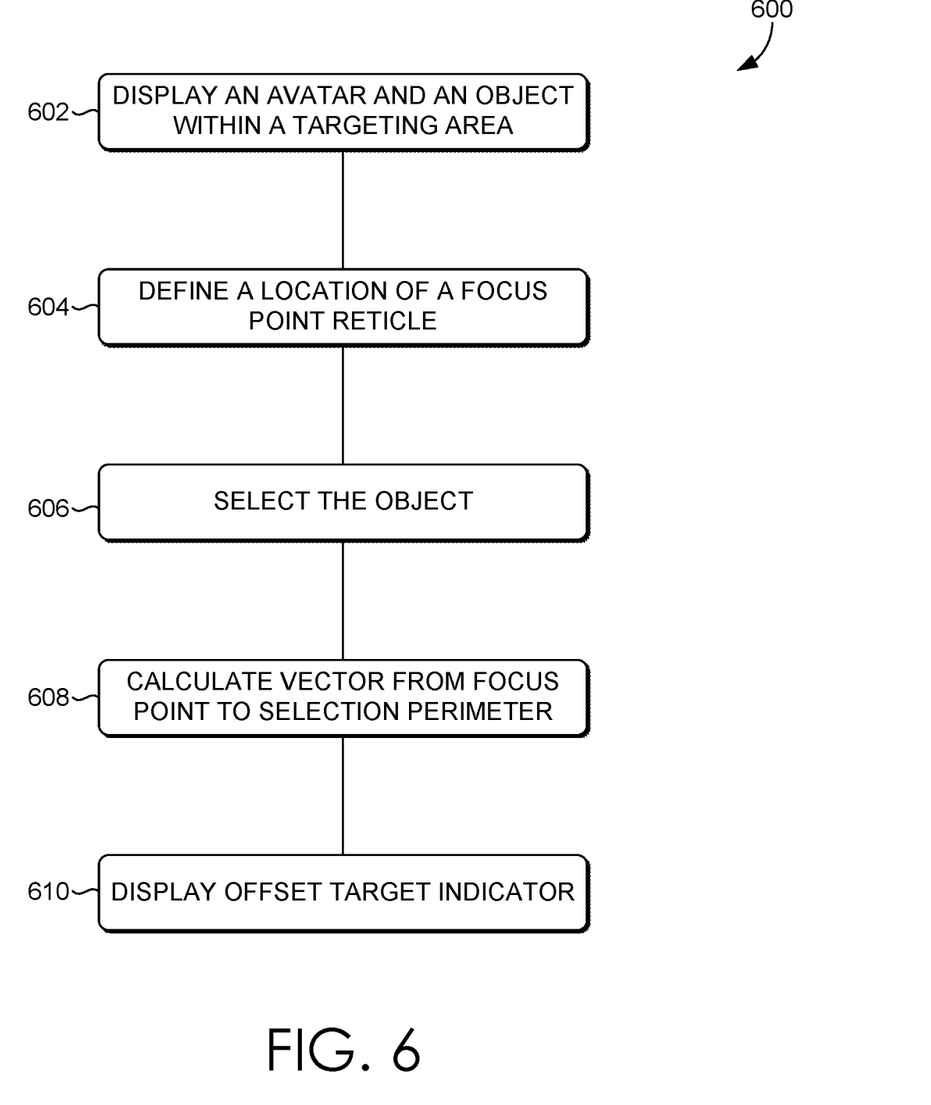
FIG. 6 depicts an example method for off-set target positioning with touchscreen gestures, in accordance with aspects hereof.

Now referring to FIG. 6, each block of method 600 can be executed by a computing process that can be performed using any combination of hardware, firmware, software, or any combination thereof. For instance, various functions can be carried out by a processor executing instructions stored in memory. In some aspects, method 600 is carried out by a gaming client (e.g., gaming client 120 or 150 of FIG. 1) associated with a mobile device or console. The method can also be embodied as computer-usable instructions stored on computer storage media. The method 600 can be provided by a standalone application, a service or hosted service (standalone or in combination with another hosted service), or a plug-in to another product, to name a few. For example, as described herein, the method 600 is a virtual tool within other software such as a virtual game. In addition, the method 600 is described, by way of example, with respect to the screen views 400 and 500 on the touchscreen of FIGS. 4 and 5. However, these methods can additionally or alternatively be executed by any one system, or any combination of systems, including, but not limited to, those described herein.

Generally, method 600 facilitates precise anchored offset position selection within a shared gaming environment, in accordance with some aspects of the present disclosure. In accordance with various aspects, the method 600 can be employed to accurately aim a character skill using a target anchor and a focus reticule offset from the target. Some aspects of method 600 begin at block 602. At block 602, the screen view of the shared gaming environment is displayed. The screen view, as described above, can include a portion of a game space and other dynamic images with the fixed and movable objects. For example, these dynamic images may include a player character (e.g., character 406 of FIG. 4) and at least one object (e.g., valid target object 410 of FIG. 4).

Continuing, a user may activate a particular skill associated with the player character. Activation of the skill can be via a touch based interaction with a skill icon (e.g., skill selection icon 402 of FIG. 4) in some aspects. In response, an AOTC component of the gaming client automatically activates a targeting assistance protocol. In some aspects, the AOTC component generates and displays a skill aiming tool (e.g., skill aiming tool 404 of FIG. 4). Alternatively, the AOTC component can monitor input from an analog joystick associated with a controller communicatively coupled with the gaming client. Additionally, the AOTC component can generate and display a targeting area (e.g., targeting area 408 of FIG. 4), based on the targeting rules associated with the activated skill. In some aspects of block 602, the AOTC component may automatically scan the targeting area for objects that satisfy the applicable targeting rules. In response to detecting a valid object, the AOTC can anchor the targeting assistance protocol on the valid object and display a selection perimeter (e.g., selected object perimeter 412 of FIG. 4) associated with the valid object. When multiple valid objects are within the targeting area the AOTC can implement rules to automatically select an initial anchor. For example, the AOTC can anchor the targeting assistance protocol on the valid object nearest to, or farthest from, the focus point reticle. Alternatively, in an aspect, the AOTC can anchor the targeting assistance protocol on the valid object nearest to, or farthest from, the player's character. However, it will be understood by those skilled in the art that any number of other initial anchoring rules may be implemented, including but not limited to those discussed in relation to FIGS. 1-3.

At block 604, the location of a focus point reticle is determined within the targeting area. For example, the location of the focus point reticle (e.g., focus point reticle 414) can be initially located at a predetermined location within the targeting area. After initial placement, the AOTC component can monitor input commands corresponding to movement of the skill aiming tool. In response to movement of the skill aiming tool, the position of the focus point reticle is dynamically modified.

At block 606, a valid object is selected as the anchor based on to the location of the focus point reticle. In other words, the AOTC component can anchor the targeting protocol on any valid object within the targeting area based on the current location of the focus point reticle. For example, as discussed in relation to the AOTC component 128 of FIG. 1, the object selected may be the closest object to the focus point reticle of a plurality of selectable objects within the target area.

In some aspects, at block 608 a vector from the focus point reticle to the selection perimeter is calculated. For example, an AOTC component can calculate a targeting vector that comprises the shortest straight line from the focus point reticle to the valid object that intersects the selection perimeter. Alternatively, the AOTC component can define the focus point reticle as co-located with a target indicator if a targeting vector that begins outside of the selection perimeter does not exist.

In some aspects of block 610 a target indicator is generated and displayed at the point where the targeting vector intersects the selection perimeter. The target indicator can be provided for display at the point along the selection perimeter, indicating the player character's future location (e.g., the character's 406 of FIG. 4 destination). Alternatively, the target indicator can be displayed with the focus point reticle or omitted from display where the AOTC component defines the focus point reticle as co-located with the target indicator. In other words, if the focus point reticle is within the selection perimeter the target indicator may be removed or modified to provide a visual indication that the focus point and the target indicator are, at least temporarily, one in the same. In some aspects, the co-location of the target indicator and the focus point reticle can be visually communicated via the screen view by altering the design of the focus point reticle in a predetermine way. For example, changing the color scheme or adding a glow or masking effect.

In some aspects, block 610 also include executing the activated skill. For example, in response to a predetermined input command (e.g., removal of a held finger or release of a button) an AOTC component can communicate instructions to execute the activated skill to the game executing component 122. The AOTC component can also communicate the target indicator's location at the time of execution.

Alternatively, some aspects of block 610 include abandoning the activated skill (e.g., canceling the skill cast). For example, in response to a predetermined input command or the passing of a predetermined period of time, the AOTC component can deactivate the targeting protocol without providing instructions to execute the activated skill to the game executing component. Similarly, the AOTC component can deactivate the activated skill.

Having described aspects of the present disclosure, an example operating environment in which embodiments of the present disclosure can be implemented is described below in order to provide a general context for various aspects of the present disclosure. Referring initially to FIG. 8 in particular, an example operating environment for implementing embodiments of the present disclosure is shown and designated generally as computing device 800. Computing device 800 is but one example of a suitable computing environment and is not intended to suggest any limitation as to the scope of use or functionality of the disclosed embodiments. Neither should the computing device 800 be interpreted as having any dependency or requirement relating to any one or combination of components illustrated.

The embodiments herein can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The described embodiments can be practiced in a variety of system configurations, including hand-held devices, consumer electronics, general-purpose computers, more specialty computing devices, etc. The described embodiments can also be practiced in distributed computing environments where tasks are performed by remote-processing devices that are linked through a communications network.

Figure 7:
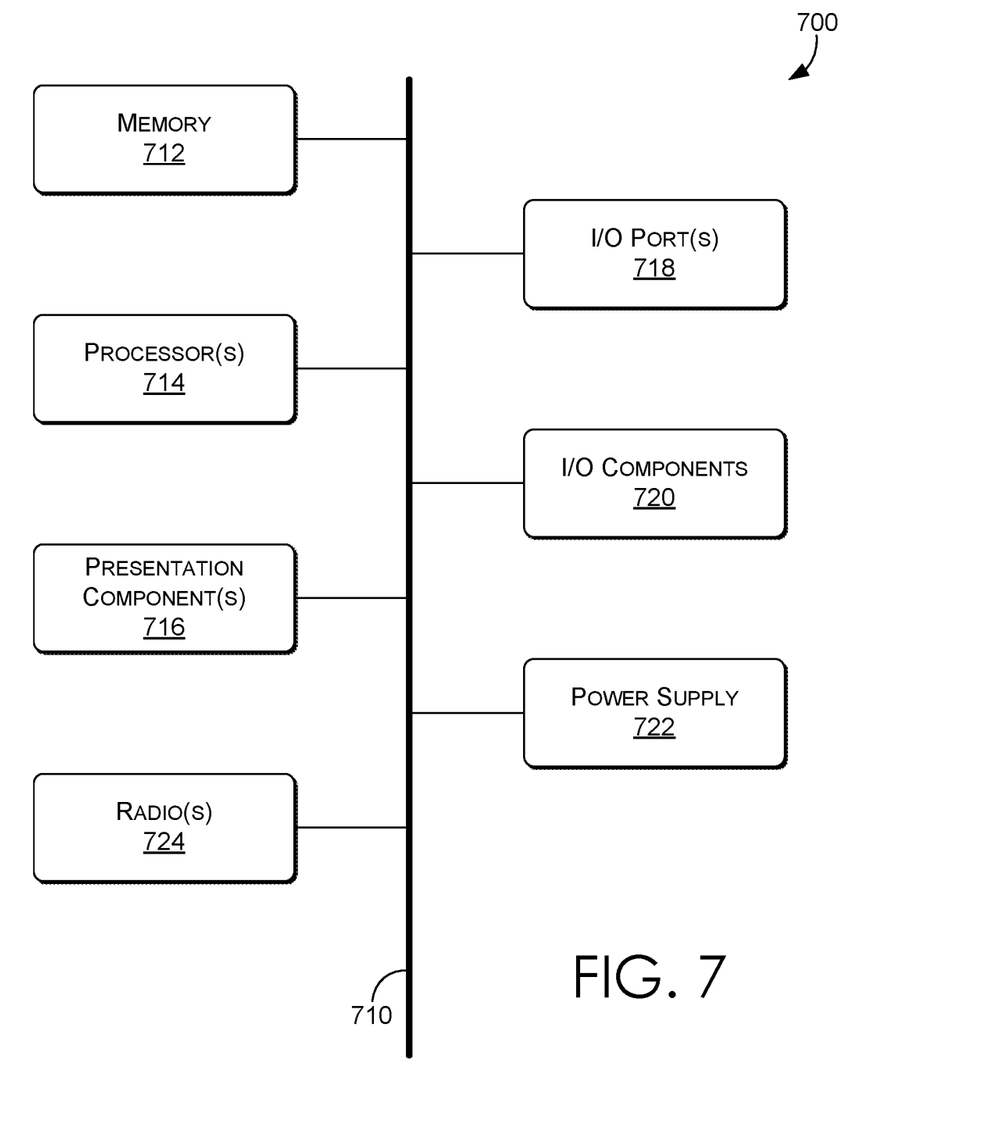
FIG. 7 depicts an example computing device, in accordance with aspects hereof.

With reference to FIG. 7, computing device 700 includes a bus 710 that directly or indirectly couples the following devices: memory 712, one or more processors 714, one or more presentation components 716, input/output (I/O) ports 718, input/output (I/O) components 720, and an illustrative power supply 722. In some example embodiments, the computing device 700 can be or can comprise a mobile electronic device such as a smart phone, tablet, touchscreen laptop, or the like. Bus 710 represents what can be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventor recognizes that such is the nature of the art, and reiterates that the diagram of FIG. 7 is merely illustrative of an example computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory can be removable, non-removable, or a combination thereof. Example hardware devices include solid-state memory, hard drives, optical-disc drives, etc. Computing device 700 includes one or more processors that read data from various entities such as memory 712 or I/O components 720. Presentation component(s) 716 present data indications to a user or other device. Example presentation components include a display device, speaker, printing component, vibrating component, etc.

I/O ports 718 allow computing device 700 to be logically coupled to other devices including I/O components 720, some of which can be built in. Illustrative components include a microphone, joystick, game pad, satellite dish, scanner, printer, wireless device, etc. The I/O components 720 can provide a natural user interface (NUI) that processes air gestures, voice, or other physiological inputs generated by a user. In some instances, inputs can be transmitted to an appropriate network element for further processing. An NUI can implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 can be equipped with depth cameras, such as stereoscopic camera systems, infrared camera systems, RGB camera systems, touchscreen technology, and combinations of these, for gesture detection and recognition. Additionally, the computing device 700 can be equipped with accelerometers or gyroscopes that enable detection of motion. The output of the accelerometers or gyroscopes can be provided to the display of the computing device 700 to render immersive augmented reality or virtual reality.

Some embodiments of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as long term evolution ("LTE"), code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth® connection to another computing device is a second example of a short-range connection, or a near-field communication connection. A long-range connection may include a connection using, by way of example and not limitation, one or more of CDMA, LTE, GPRS, GSM, TDMA, and 802.16 protocols.

As can be understood, embodiments of the present disclosure provide for, among other things, systems and methods for precise positioning on a touchscreen. The present disclosure has been described in relation to particular embodiments, which are intended in all respects to be illustrative rather than restrictive. Alternative embodiments will become apparent to those of ordinary skill in the art to which the present disclosure pertains without departing from its scope. For example, although generally described in the context of a mobile game played on a touchscreen equipped mobile device, aspects hereof can facilitate selectively activated targeting using a focus reticle off-set from the target in video games played on other devices. For instance in a particular aspect, a gaming client can be executed by a console (e.g., Sony's® PlayStation® line of consoles, Microsoft's® Xbox® line of consoles, Nintendo's® Switch® line of consoles, Google's® Stadia® line of consoles, and so forth). Those skilled in the art will understand that, in such an aspect, a display may include a traditional television or computer display. Similarly, a touch-based input interface can be replaced with a wired or wireless controller-based input interface. In such an aspect, the player UI may omit a graphic representation of the skill aiming tool (e.g., skill aiming tool 404 of FIG. 4) along with any number of other UI elements. Advantageously, implementation of the aspects described herein in a console game can address some of the limitations associated with the relatively limited input options associated with console controllers.

Further, it is contemplated that some of the aspects described herein can be implemented in a cross-platform (e.g., traditional gaming systems, mobile devices, and consoles in any combination) MOBA, MMORPG, RTS game, or any other genre of game. Said another way, the selectively activated targeting assistance protocols described herein can improve the compatibility of a video games played across multiple gaming platforms in the same shared gaming environment. As such, it is contemplated that some of the aspects described herein can be implemented in desktop or laptop based MOBA (e.g., League of Legends C)), MMORPG, real-time strategy (RTS) game, or any other genre of game.

From the foregoing, it will be seen that embodiments of the present disclosure are one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

I claim:

1. A non-transitory computer storage medium storing computer-useable instructions that, when used by one or more computing devices, cause the one or more computing devices to perform operations comprising:
    providing for display a character and an object, wherein the character is associated with at least a first targeting area and the object is associated with a selection perimeter;
    defining a location of a focus point reticle within the first targeting area;
    selecting the object based on the location of the focus point reticle and a determination that the object is within the first targeting area;
    calculating a vector from the location of the focus point reticle to the object, the vector intersecting the selection perimeter at an intersecting point, the intersecting point being a closest point along the selection perimeter to the location of the focus point reticle; and
    providing for display an offset target indicator at the intersecting point along the selection perimeter.

2. The computer storage media of claim 1, wherein the character is at a center of at least the first targeting area.

3. The computer storage media of claim 2, wherein the first targeting area is a semicircular area that is positioned based on a direction from the character to a location of the object.

4. The computer storage media of claim 1, further comprising:
defining the point along the selection perimeter as an offset targeting position in response to a selection of the point.

5. The computer storage media of claim 4, wherein the location of the focus point reticle is defined based on a touch input, and the point is selected in response to a detected termination of the touch input.

6. The computer storage media of claim 4, further comprising:
in response to the offset targeting position being defined, relocating the character to the intersecting point.

7. The computer storage media of claim 4, further comprising:
in response to the offset targeting position being defined, changing a color of the offset target indicator.

8. The computer storage media of claim 1, wherein the vector is calculated based on a determination that the location of the focus point reticle is outside of the selection perimeter.

9. The computer storage media of claim 1, wherein while the location of the focus point reticle is being defined within the first targeting area, a line is drawn between the focus point reticle and the character.

10. A computer-implemented method for defining an offset targeting position relative to an object in a user interface, the method comprising:
providing for display, by a computing device, a character and the object within the user interface, wherein the character is associated with at least a first targeting area and the object is associated with a selection perimeter;
defining, by the computing device, a location of a focus point reticle displayed in the user interface and within the first targeting area based on a first signal received from a touch screen coupled to the computing device, wherein the first signal indicates receipt of a touch gesture;
selecting, by the computing device, the object based on the location of the focus point reticle and a determination that the object is within the first targeting area;
calculating, by the computing device, a vector from the location of the focus point reticle to the location of the object, the vector intersecting the selection perimeter at a point along the selection perimeter, the point being a closest point along the selection perimeter to the location of the focus point reticle; and
defining, by the computing device, the point along the selection perimeter as the offset targeting position in response to a second signal from the touch screen, wherein the second signal indicates termination of the touch gesture.

11. The method of claim 10, comprising the offset targeting position being displayed in the user interface and along the selection perimeter.

12. The method of claim 10, wherein the location of the focus point reticle is defined based on a touch input, and the point is selected in response to a detected termination of the touch input.

13. The method of claim 10, wherein the character is at a center of at least the first targeting area.

14. The method of claim 13, wherein the first targeting area is a circular area.

15. The method of claim 10, wherein the vector is calculated based on a determination that the location of the focus point reticle is outside of the selection perimeter.

16. The method of claim 10, wherein while the location of the focus point reticle is being defined within the first targeting area, a line is drawn between the focus point reticle and the character.

17. A computerized system comprising:
one or more processors; and
one or more computer storage media storing computer-usable instructions that, when used by the one or more processors, cause the one or more processors to:
provide for display a character and an object, wherein the character is associated with at least a first targeting area and the object is associated with a selection perimeter;
define a location of a focus point reticle within the first targeting area;
select the object based on the location of the focus point reticle and a determination that the object is within the first targeting area;
based on a determination that the location of the focus point reticle is outside of the selection perimeter, calculate a vector from the location of the focus point reticle to the object, the vector intersecting a point along the selection perimeter, the point being a closest point along the selection perimeter to the location of the focus point reticle; and
provide for display an offset target indicator at the point along the selection perimeter.

18. The computerized system of claim 17, wherein the character is at a center of at least the first targeting area.

19. The computerized system of claim 18, wherein the first targeting area is a semicircular area that is positioned based on a direction from the character to a location of the object.

20. The computerized system of claim 17, further comprising:
defining the point along the selection perimeter as an offset targeting position in response to a selection of the point.

* * * * *